United States Patent [19]
Nishikata

[11] Patent Number: 5,754,507
[45] Date of Patent: May 19, 1998

[54] MULTI-LAYERED OPTICAL DISK REPRODUCING APPARATUS WITH FOCUS SEARCH

[75] Inventor: Masanobu Nishikata, Tokyo, Japan

[73] Assignee: Sony Corporation, Tokyo, Japan

[21] Appl. No.: 571,360

[22] Filed: Dec. 13, 1995

[30] Foreign Application Priority Data

Dec. 16, 1994 [JP] Japan .................... 6-334282

[51] Int. Cl.⁶ .................................... G11B 7/095
[52] U.S. Cl. .................... 369/44.29; 369/44.25; 369/54
[58] Field of Search ................ 369/44.25, 44.27, 369/44.29, 54

[56] References Cited

U.S. PATENT DOCUMENTS

| | | | |
|---|---|---|---|
| 4,541,084 | 9/1985 | Oku et al. | 369/44.29 X |
| 4,769,801 | 9/1988 | Funada et al. | 369/44.29 |
| 5,060,215 | 10/1991 | Kawamura et al. | 369/44.27 X |
| 5,086,420 | 2/1992 | Doi | 369/44.25 |
| 5,263,011 | 11/1993 | Maeda et al. | |
| 5,379,282 | 1/1995 | Wachi | 369/44.25 X |
| 5,477,514 | 12/1995 | Watanabe et al. | 369/44.28 |

FOREIGN PATENT DOCUMENTS

A-0 517 490  12/1992  European Pat. Off. .

OTHER PUBLICATIONS

Patent Abstracts of Japan, vol. 5, No. 146, P-080, & JP 56-80835, Sep. 16, 1981.

*Primary Examiner*—W. R. Young
*Attorney, Agent, or Firm*—Frommer Lawrence & Haug LLP; William S. Frommer

[57] ABSTRACT

To move an object lens out of focalization on a layer and to accelerate it upwardly, a drive signal DRV is set HIGH, and a focus OPEN signal is set LOW. After a value a counter exhibits at this time is held in a register T1, the counter is reset at zero. Then a value the counter exhibits upon FZC+ being LOW is held in a register $T2_A$, and a value the counter exhibits upon FZC− being HIGH is held in a register $T2_B$. The value of a register T3 is calculated from T1 and the average of T2 and $T2_B$, and when the counter value becomes equal to the sum of T1 and T3, DRV is set HIGH. After FZC− becomes LOW, OPEN is set HIGH, and the focus jump operation is completed.

18 Claims, 6 Drawing Sheets

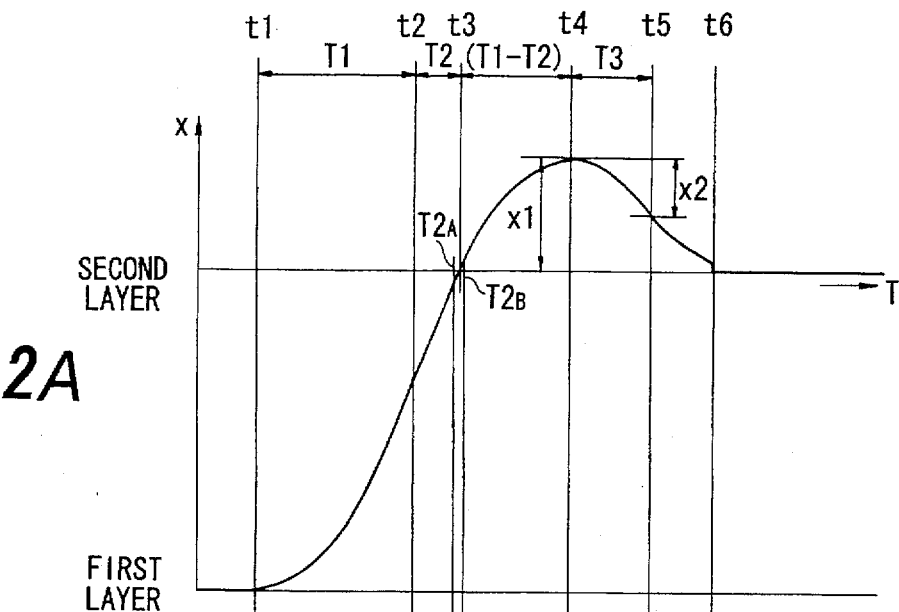
Fig. 2A
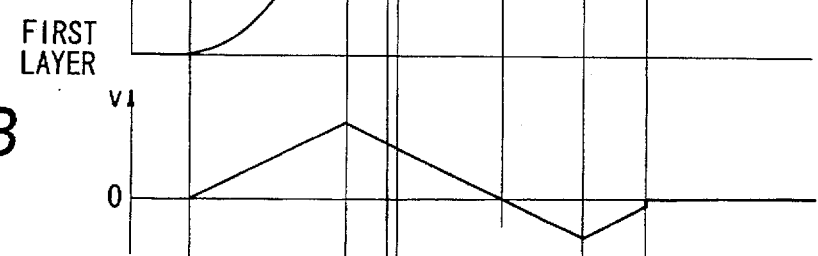
Fig. 2B
Fig. 2C RF
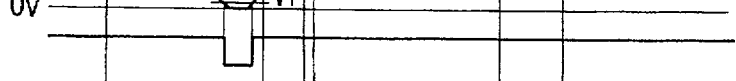
Fig. 2D FOK
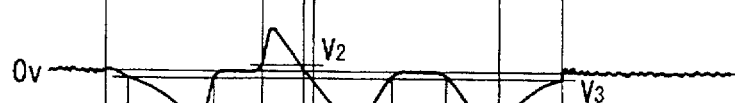
Fig. 2E ERR
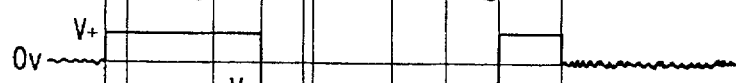
Fig. 2F COIL
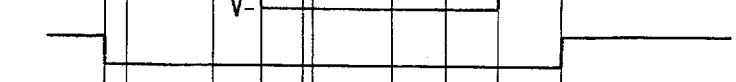
Fig. 2G OPEN
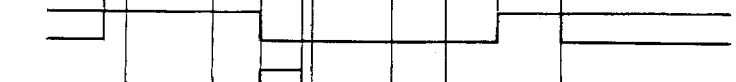
Fig. 2H DRV
Fig. 2I FZC+
Fig. 2J FZC−

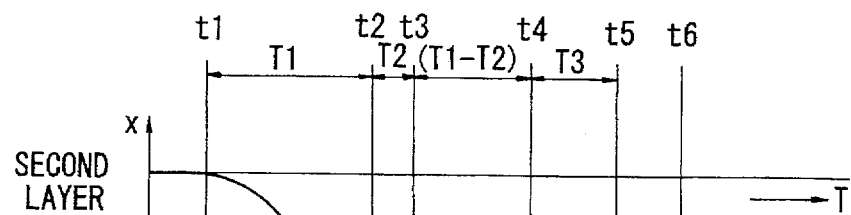
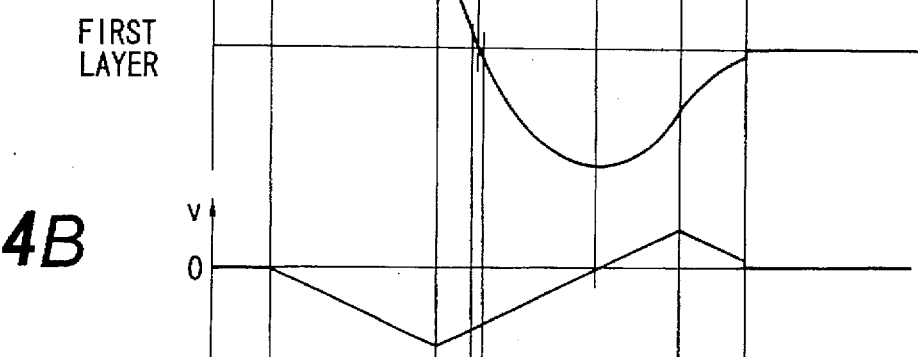
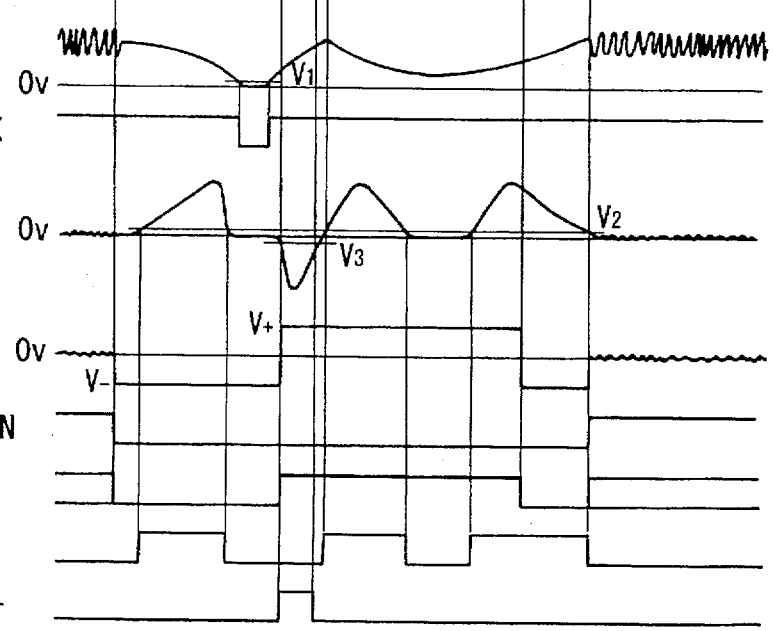

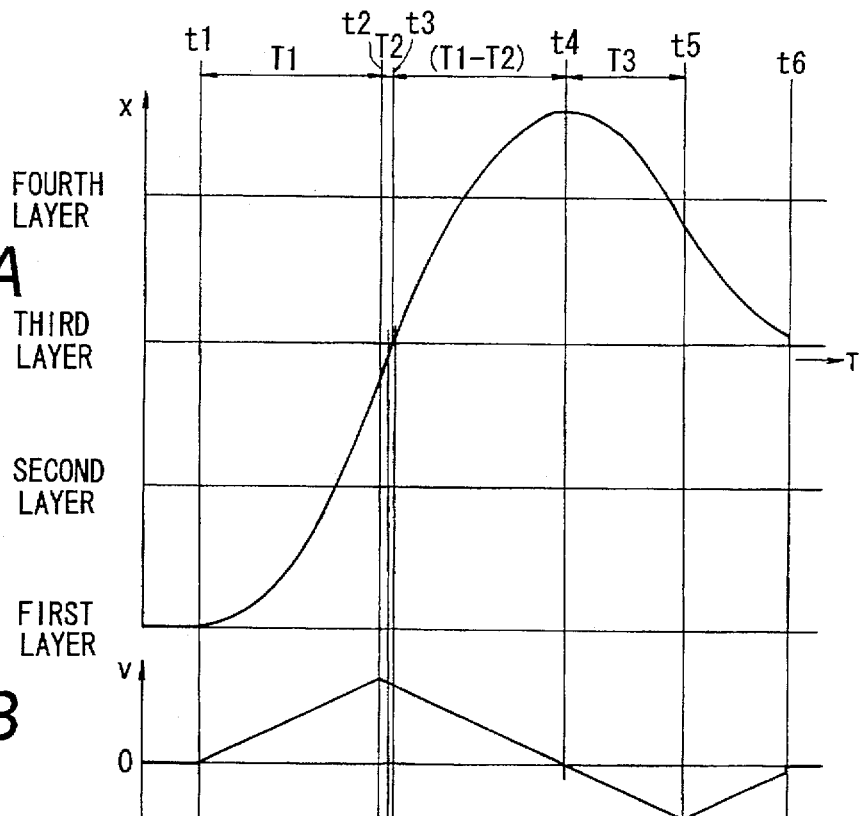
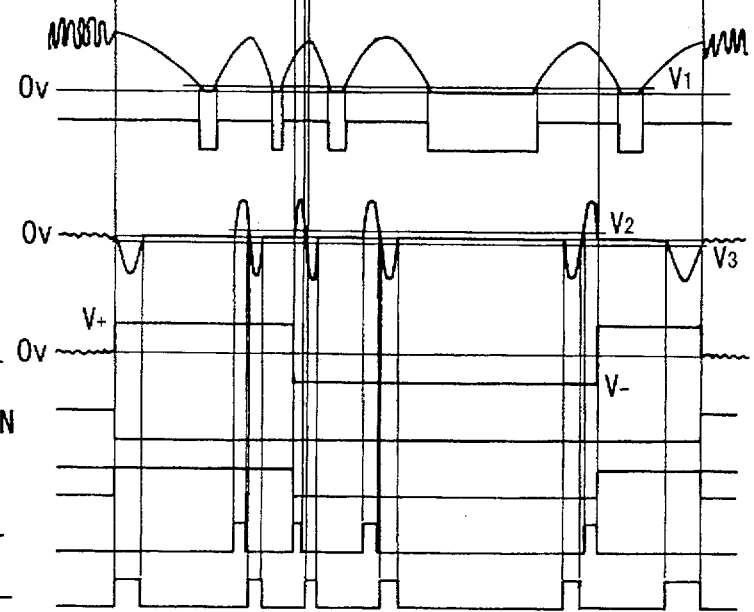

MULTI-LAYERED OPTICAL DISK REPRODUCING APPARATUS WITH FOCUS SEARCH

BACKGROUND OF THE INVENTION

1. Field of the Invention

This invention relates to an apparatus and a method for reproducing digital data, for example, recorded on two or more layers of a multi-layered disk.

2. Description of the Related Art

Optical disk reproducing apparatuses have been used for reading out digital image data recorded on optical disks. Data recorded on a disk is digital and contains a large amount of information. It often occurs, therefore, that the entirety of a desired unit of data cannot be recorded on a single disk. To cope with the problem, a multi-layered disk having a plurality of recording layers on a single disk has been proposed.

Upon reproducing data from an optical disk, the disk is rotated in a predetermined direction by a spindle motor after focus servo control and tracking servo control. Consequently, focus servo control is executed by moving an object lens in a pickup in a face-to-face relation with the disk so as to close the servo loop at the zero-cross of an S-shaped curve of a first detected focus error.

If this is applied to a multi-layered optical disk having two or more layers, in order to move focalization of the object lens from one layer to another, it is necessary to perform a focus servo control of a destined layer by conducting another focus search after canceling the focus servo control which has been effective hitherto. During focus search with a multi-layered optical disk, a number of S-curves corresponding to the number of layers appear in the focus error signal. When the second layer is to be focalized, focus servo control may be performed at the second S-curve. Similarly, for focalization to the fourth layer, focus servo control may be performed at the fourth S-curve.

Such focus search, however, takes a long time for movement from a layer to another.

OBJECTS AND SUMMARY OF THE INVENTION

It is therefore an object of the invention to provide an apparatus and a method for reproducing data from a multi-layered disk, capable of reducing the time required for movement from a layer to another.

According to the invention, there is provided a disk reproducing apparatus for reproducing data recorded on a plurality of layers of an optical disk, comprising: first comparator means for comparing a focus error signal with a first voltage; second comparator means for comparing the focus error signal with a second voltage; drive voltage supplying means for selectively supplying a first or a second object lens drive voltage in response to results of comparison supplied from the first and/or second comparator means; and means for driving an object lens with the object lens drive voltage supplied from the drive voltage supplying means.

There is further provided a disk reproducing method for reproducing data recorded on a plurality of layers of an optical disk, comprising: a first step for accelerating an object lens in a first direction; a second step for detecting that a focus error signal surpasses a first voltage and for accelerating the object lens in a second direction different from the first direction; a third step for detecting that the object lens has moved for a predetermined duration of time and for accelerating the object lens in the first direction; and a fourth step for detecting that the focus error signal surpasses a second voltage and for starting focus servo control.

When focalization is changed from a layer to another of a multi-layered disk, the object lens is first accelerated up to the rising of the S-curve in the focus error signal corresponding to the destined layer, passing over the just focus point, then accelerated in the opposite direction, and again accelerated in the initial direction, thus to establish focalization to the destined layer.

The above, and other, objects, features and advantages of the present invention will become readily apparent from the following detailed description thereof which is to be read in connection with the accompanying drawings.

BRIEF DESCRIPTION OF THE DRAWINGS

FIGS. 2A to 2J are timing charts of a focus jump operation from a first layer to a second layer in the multi-layered disk reproducing apparatus according to the invention;

FIGS. 4A to 4J are timing charts of a focus jump operation from the second layer to the first layer in the multi-layered disk reproducing apparatus according to the invention;

FIGS. 6A to 6J are timing charts of a focus jump operation from the first layer to the third layer of the multi-layered disk reproducing apparatus according to the invention.

DETAILED DESCRIPTION OF THE PREFERRED EMBODIMENTS

Figure 1:
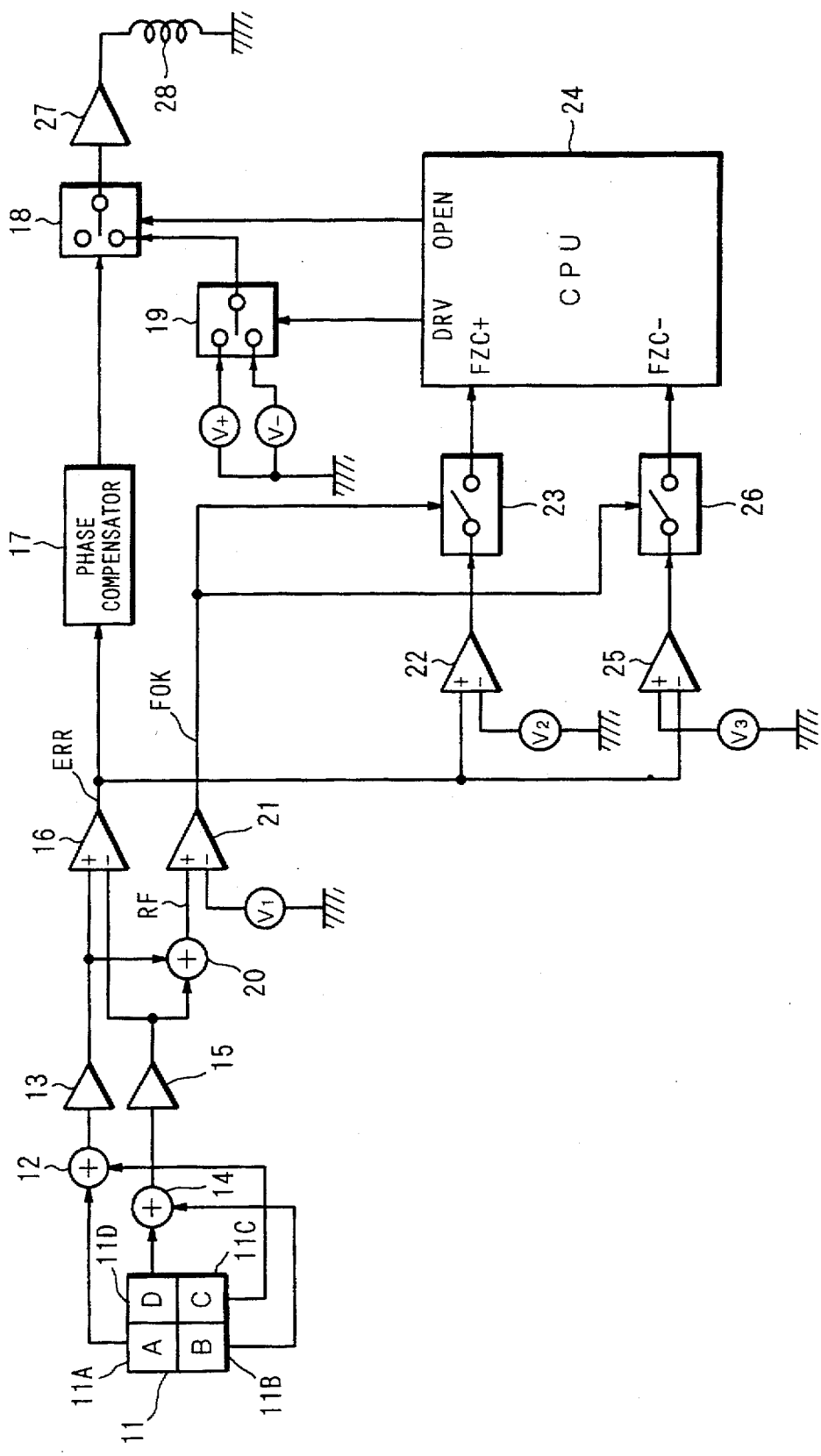
FIG. 1 is a block diagram of a multi-layered disk reproducing apparatus according to the invention.

A multi-layered disk reproducing apparatus embodying the invention is described below with reference to the drawings. FIG. 1 is a block diagram of the multi-layered optical disk reproducing apparatus according to the invention for reproducing data from an optical disk. Numeral 11 denotes a quartered detector comprising four detectors (11A, 11B, 11C and 11D) which are based on an astigmatic process. The quartered detector 11 detects whether an irradiated laser beam is exactly focalized on the optical disk. Detection signals of the detectors 11A and 11C are supplied to an adder 12, and those of the detectors of 11B and 11D to an adder 14. The sum signal (A+C) output from the adder 12 is supplied to one of input terminals of an adder 20 and one of input terminals of a comparator 16 through an amplifier 13.

The sum signal (B+D) output from the adder 14 is supplied to the other terminal of the adder 20 and the other terminal of the subtracter 16 via an amplifier 15. Supplied from the subtracter 16 is a ((A+C)−(B+D)) signal as a focus error signal ERR which enters a phase compensation circuit 17, one of input terminals of a comparator 22, and one of input terminals of a comparator 25. Applied to the other terminal of the comparator 22 is a comparison voltage V2. The comparison voltage V2 has a value higher than noise near 0V. The comparator 22 performs zero-cross detection of the plus side, and outputs the detection signal to a switch 23 when the focus error signal ERR is equal to or higher than the comparison voltage V2. Similarly, a comparison voltage V3 is applied to the other input terminal of the comparator 25. The comparison voltage V3 has a value lower than noise near 0V. The comparator 25 performs zero-cross detection of the minus side, and outputs a detection signal to a switch 26 when the focus error signal ERR is equal to or lower than the comparison voltage V3.

The focus error signal, phase-compensated by the phase compensation circuit 17, is supplied to one of selective terminals of a switch 18. Supplied to the other selective terminal of the switch 18 is a focus search drive voltage from a switch 19. The switch 19 is supplied with a focus search drive voltage V+ at one of selective terminals and a focus search drive voltage V− at the other selective terminal. When the output signal of the phase compensation circuit 17 is selected by the switch 18, the focus servo loop for the optical disk is on. On the other hand, when the output signal of the switch 19 is selected, the focus servo loop is off, focus jump operation is done. In response to the signal output from the switch 19, an object lens provided in the pickup moves. When the focus search drive voltage V+ is selected at the switch 19, the object lens is accelerated upward. When the focus search drive voltage V− is selected, the object lens is accelerated downward.

A reproduction RF signal (A+B+C+D) output from the adder 20 is supplied to one of input terminals of a comparator 21. Applied to the other input terminal of the comparator 21 is a comparison voltage V1. The comparator 21 compares the reproduction RF signal with the comparison voltage V1. When the reproduction RF signal is equal to or higher than the comparison voltage V1, a focus OK signal FOK indicating focalization being proper is output to a switch 23 and a switch 26 as a control signal. When the switch 23 is turned on with the supply of the focus OK signal FOK, a zero-cross detection signal FZC+ output from the comparator 22 is supplied to a CPU 24. Similarly, when the switch 26 is turned on with the supply of the focus OK signal FOK, a zero-cross detection signal FZC− output from the comparator 25 is supplied to the CPU 24. That is, switches 23 and 26 behave to gate the zero-cross detection signals FZC+ and FZC− by using the focus OK signal FOK. This aims at preventing malfunctions by noise at ranges where the reproduction RF signal exhibits a low signal level. The CPU 24 is a typical one with a timer counter.

During focus jump operations, the focus search drive voltage V+ or V− supplied from the switch 19 is selected, and the selected drive voltage is output from the switch 18 to accelerate the object lens upward or downward. Changeover of the switch 19 is controlled by a drive signal DRV from CPU 24 on the basis of the zero-cross detection signal FZC+ or FZC− supplied from the comparators 22 and 25. Focus search drive voltages V+ and V− used in this example are equal in absolute value. In CPU 24, a focus OPEN signal is generated, and it is supplied to the switch 18 as a control signal. Accordingly, the phase compensation circuit 17 is selected by the switch 18. The signal selected by the switch 18 is transferred through a drive amplifier 27 to a focus drive coil 28 with one end grounded. The drive amplifier 27 is an N-time amplifier for phase compensation.

When the focus OPEN signal becomes the HIGH level and the switch 18 selects the phase compensation circuit 17, the focus servo loop is on. When the focus OPEN signal becomes the LOW level and the switch 18 selects the switch 19, the focus servo loop is off, and the focus jump operation is performed.

FIGS. 2A to 2J are timing charts for focus jump from a first layer to a second layer. At FIGS. 2A, taking time T on the horizontal axis and the lens height x on the vertical axis, the moving track of the object lens is illustrated. As stated above, for changing focalization from the just focus point of the first layer to the just focus point of the second layer, the object lens is first moved to once overshoot the just focus point of the destined second layer, and thereafter moved back to be focalized at the just focus point of the second layer. The speed of the object lens during these movements is shown at FIG. 2B where the lens speed v lies on the vertical axis.

As shown at FIG. 2A, the movement from the just focus point of the first layer to the just focus point of the second layer starts at the point of time t1. That is, at time t1, the control is changed from the focus servo loop control to the focus jump control. In the period T1 from time t1 to time t2, the object lens is accelerated upward. Time t2 is the point where the S-curve of the focus error signal ERR of the second layer, when rising, surpasses the comparison voltage V2. After the object lens passes time t2, it is accelerated downward, passing a point (period of time t3) where the object lens intersects with the just focus point of the second layer. The period of time from the downward acceleration of the object lens to the intersection of the object lens with the just focus point of the second layer is designated by T2.

The object lens is further accelerated downward, and passes time t4 where the lens speed is zero, taking the same period of time as T1 in which the object lens was accelerated upward. The period of time from time t3 where the object lens intersects the just focus point of the second layer to time t4 where the speed of the object lens becomes zero is determined as time (T1−T2). The object lens, after passing time t4, is accelerated downward by time t5 (in the period of time T3), and then controlled to stop at the just focus point of the second layer. Time t5 is a point where the object lens is distant from the just focus point of the second layer by one half (x2) of such distance at time t4 (x1).

Then the distance x1 is $$x1 = \alpha(T1-T2)^2/2 \qquad (1)$$

Similarly, the distance x2 is $$x2 = \alpha T3^2/2 \qquad (2)$$

where α is the acceleration.

CPU 24 calculates the point of time t5 (or the period of time T3) from Equations (1) and (2).

$$\alpha T3^2/2 = \frac{1}{2} \times \alpha(t1-t2)^2/2 \qquad (3)$$

Equations (1) and (2) are related as shown by Equation (3) which can be rewritten $$T3 = (T1-T2)/\sqrt{2} \qquad (4)$$

Among digital data recorded on the first layer of the optical disk, the reproduction RF signal is read out by time t1 as shown at FIG. 2C. Since the digital data recorded on the optical disk relies on the presence or absence of pits, the reproduction RF signal exhibits the waveform as illustrated. In order to effect focus jump from the first layer to the second layer, the object lens must first be accelerated upward. Therefore, the focus OPEN signal (FIG. 2G) is set to the LOW level, and the drive signal DRV (FIG. 2H) is set to the HIGH level. The focus OPEN signal shown at FIG. 2G maintains the LOW level to the end of the control for focus jump.

When the drive signal DRV becomes the HIGH level, the object lens moves upward. Accordingly, the signal level of the reproduction RF signal is lowered. When the reproduction RF signal becomes lower than the comparison voltage V1, the focus OK signal FOK becomes LOW. When the signal level of the reproduction RF signal again goes high and surpasses the comparison voltage V1, the focus OK signal FOK becomes HIGH. This is because the focus jump causes the object lens to begin to move out of focalization on the first layer toward focalization on the second layer. After that, the focus jump to the second layer is completed at time t6, and digital data recorded on the second layer of the optical disk is read out.

If a focus error signal ERR (FIG. 2E) is generated in the minus side and surpasses the comparison voltage V3, then the zero-cross detection signal FZC− shown at FIG. 2J becomes HIGH. When the focus error signal in the minus side approaches 0V and becomes smaller than the comparison voltage V3, the zero-cross detection signal FZC− becomes LOW.

When the focus jump from the first layer to the second layer is performed, the just focus point of the second layer becomes nearer than the just focus point of the first layer. Therefore, a focus error signal ERR is generated in the plus side with reference to the just focus point of the second layer. As shown at FIG. 2E, when the focus error signal ERR surpasses the comparison voltage V2 (time t2), the zero-cross detection signal FZC+ becomes HIGH, and the drive signal DRV (FIG. 2H) becomes LOW. Therefore, the focus search drive voltage V− (FIG. 2F) is supplied to the focus drive coil 28. That is, the object lens is accelerated downward. When the focus error signal ERR becomes lower than the comparison voltage V2, the zero-cross detection signal FZC+ becomes LOW.

The drive signal DRV (FIG. 2H) again becomes HIGH at time t5 where the object lens is distant from the just focus point of the second layer by a distance which is half the distance at time t4, and the focus search drive voltage V+ (FIG. 2F) is supplied to the focus drive coil 28. The supply of the focus search drive voltage V+ continues until the object lens reaches the just focus point of the second layer (point of time t6). After time t6, digital data on the second layer is reproduced in the ordinary way.

However, the time when the object lens reaches the just focus point of the second layer does not necessarily coincide with t6, affected by the gravity, and the point of time where the focus error signal ERR becomes lower than the comparison voltage V3 is determined as time t6. Note that no affection is taken into consideration because the acceleration of the object lens is larger than the gravity acceleration. Also note that the focus search drive voltages V+ and V− need not equal in absolute value. In such cases, if the absolute value of the focus search drive voltage V− is M times the focus search drive voltage V+, then Equation (4) becomes $$T3 = (T1 - T2) \times \sqrt{M/2} \qquad (5)$$

Figure 3:
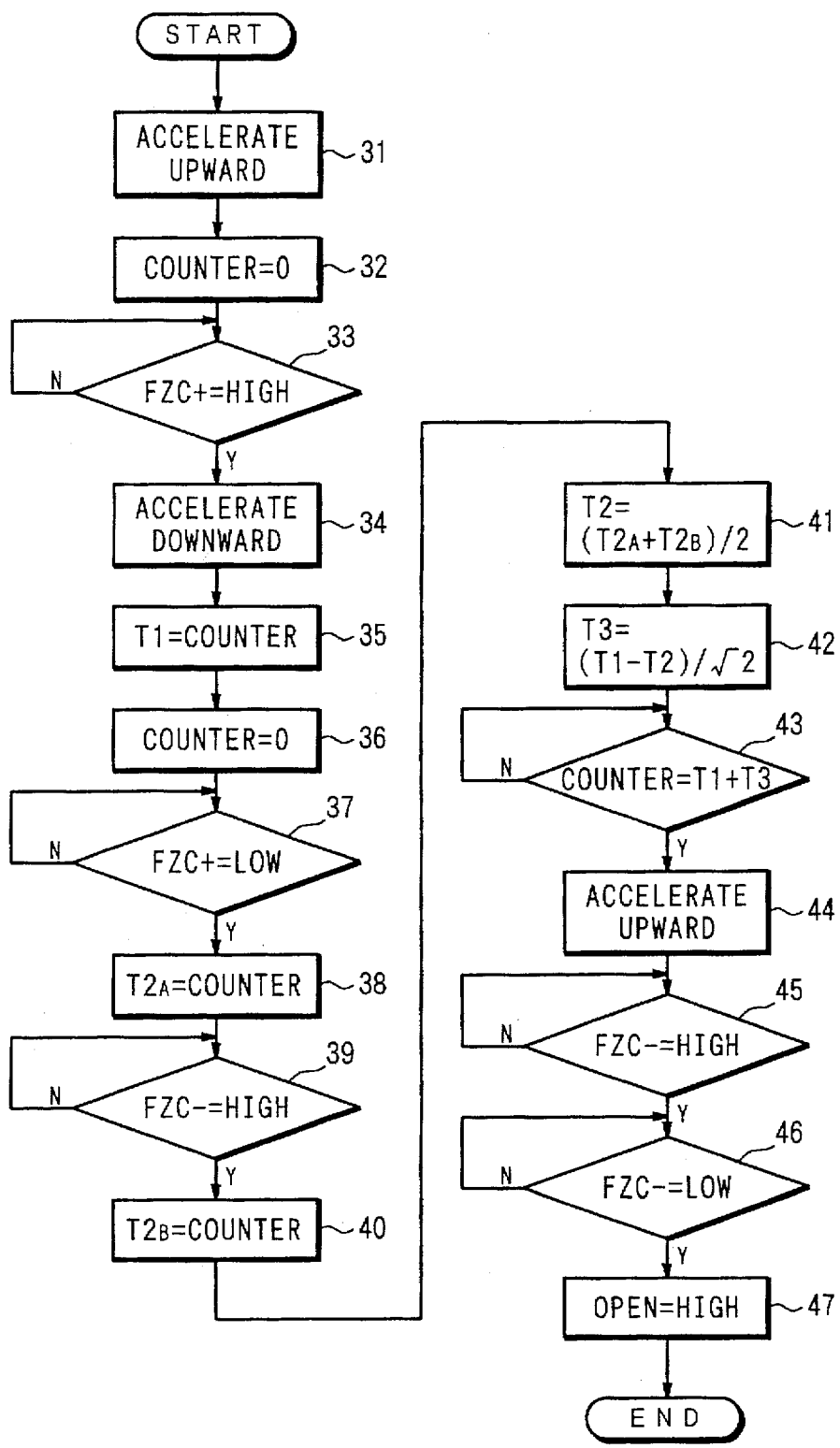
FIG. 3 is a flow chart of a soft-ware control of a focus jump operation from the first layer to the second layer in the multi-layered disk reproducing apparatus according to the invention.

FIG. 3 shows a process of control by soft ware for moving the object lens from the just focus point of the first layer to the just focus point of the second layer. In upward acceleration of the object lens in step 31, since the focus search drive voltage V+ is supplied to the focus drive coil 28 by setting the drive signal HIGH and the focus OPEN signal LOW, the object lens is accelerated upward. In step 32, after the data of the counter is replaced with zero, the control proceeds to step 33. As to whether the zero-cross detection signal FZC+ is HIGH or not in step 33, if FZC+ is HIGH, the control proceeds to step 34; however, if FZC+ is low, the control does not proceed to step 34 until FZC+ becomes HIGH.

For downward acceleration of the object lens in step 34 after the zero-cross detection signal FZC+ becomes HIGH, the drive signal DRV is set LOW, and the focus search drive voltage V− is supplied to the focus drive coil 28 to accelerate the object lens downward.

Then the control proceeds to step 35. In step 35 the value of the counter is held in an address labeled with T1 (the address labelled T* is hereinbelow called register T*), and in step 36 the value of the counter is again set zero.

The register T1 holds the value of a period of time counted after the object lens is accelerated upward until the zero-cross detection signal FZC+ becomes HIGH, and the counted value is taken as the period of time T1. The value to be counted may be time, or any other amount equivalent to time, such as clocks of the apparatus, may be selected to be held in the register. As to whether the zero-cross detection signal FZC+ is LOW or not in step 37, if FZC+ is LOW, then the control proceeds to step 38; however, if FZC+ is HIGH, the control does not proceed to step 38 until FZC+ becomes LOW. In step 38 the value of the counter is held in register $T2_A$.

As to whether the zero-cross detection signal FZC− is HIGH or not in step 39, if FZC− is HIGH, the control proceeds to step 40; however, if FZC− is LOW, the control does not proceed to step 40 until FZC− becomes HIGH. In step 40 the value of the counter is held in register $T2_B$, and in step 41 the average value of register $T2_A$ and register $T2_B$ is held in register T2. In next step 42, a result of operation of $(T1-T2)/\sqrt{2}$ is held in register T3. In step 43, it is detected whether the sum of register T1 and register T3 equals the value of the counter or not. If they are equal, the control proceeds to step 44; however, if not, step 43 is repeated until the sum of T1 and T3 becomes equal to the value of the counter.

After that, as to upward acceleration of the object lens in step 44, the drive signal DRV is set HIGH, and the focus search drive voltage V+ is supplied to the focus drive coil 28 to accelerate the object lens upward. Detection of whether the zero-cross detection signal FZC− is HIGH or not in step 45 is a chattering step, and the control proceeds to step 46 when the zero-cross detection signal FZC− is detected to be HIGH. As to whether the zero-cross detection signal FZC− is LOW or not in step 46, if it is determined that FZC− is LOW and that focalization on the just focus point of the second layer is established, the control proceeds to step 47. In step 47, the focus OPEN signal is set HIGH, thus changing the switch 18, terminating the focus jump from the first layer to the second layer, and restoring the focus servo loop.

FIGS. 4A to 4J show a timing chart for focus jump from the second layer to the first layer. At FIG. 4A, taking time T on the horizontal axis and the lens height x on the vertical axis, the moving track of the object lens is illustrated. As stated above, for changing focalization from the just focus point of the second layer to the just focus point of the first layer, the object lens is first moved to once overshoot the just focus point of the destined first layer, and thereafter moved back to be focalized at the just focus point of the first layer. The speed of the object lens during these movements is shown at FIG. 4B where the lens speed v lies on the vertical axis.

As shown at FIG. 4A, the movement from the just focus point of the second layer to the just focus point of the first layer starts at time t1. That is, at time t1, the control is changed from the focus servo loop control to the focus jump control. In the period of time T1 from time t1 to time t2, the object lens is accelerated downward. Time t2 is the point where the S-curve of the focus error signal ERR of the first layer, when rising, surpasses the comparison voltage V3. After the object lens passes time t2, it is accelerated upward, passing a point (time t3) where the object lens intersects with the just focus point of the first layer. The object lens is further accelerated upward, and passes time t4 where the lens speed is zero, taking the same period of time as T1 in which the object lens was accelerated downward. The object lens, after passing time t4, is accelerated upward by time t5, and then controlled to stop at the just focus point of the first layer.

That is, as shown at FIG. 4C, digital data recorded on the second layer of the optical disk is read out as the reproduction RF signal by time t1. Since the digital data recorded on the optical disk relies on the presence or absence of pits, the reproduction RF signal exhibits the waveform as illustrated. In order to effect focus jump from the second layer to the first layer, the object lens must first be accelerated downward. Therefore, the focus OPEN signal (FIG. 4G) is set LOW, and the drive signal DRV (FIG. 4H) is set LOW. The focus OPEN signal shown at FIG. 4G maintains the LOW level to the end of the control for focus jump.

When the drive signal DRV becomes LOW, the object lens moves downward. Accordingly, the signal level of the reproduction RF signal is lowered. When the reproduction RF signal becomes lower than the comparison voltage V1, the focus OK signal FOK becomes LOW. When the signal level of the reproduction RF signal again goes high and surpasses the comparison voltage V1, the focus OK signal FOK becomes HIGH. This is because the focus jump causes the object lens to begin to move out of focalization on the second layer toward focalization on the first layer. After that, the focus jump to the first layer is completed at time t6, and digital data recorded on the second layer of the optical disk is read out.

If a focus error signal ERR (FIG. 4E) is generated in the plus side and surpasses the comparison voltage V2, then the zero-cross detection signal FZC+ shown at FIG. 4H becomes HIGH. When the focus error signal in the plus side approaches 0V and becomes smaller than the comparison voltage V2, the zero-cross detection signal FZC+ becomes LOW.

When the focus jump from the second layer to the first layer is performed, the just focus point of the first layer becomes nearer than the just focus point of the second layer. Therefore, a focus error signal ERR is generated in the minus side with reference to the just focus point of the first layer. As stated above, when the focus error signal ERR (FIG. 4E) surpasses the comparison voltage V3 (time t2), the zero-cross detection signal FZC− becomes HIGH, and the drive signal DRV (FIG. 4H) becomes HIGH. Therefore, the focus search drive voltage V+ (FIG. 4F) is supplied to the focus drive coil 28. That is, the object lens is accelerated upward. When the focus error signal ERR becomes lower than the comparison voltage V3, the zero-cross detection signal FZC− becomes LOW.

The drive signal DRV (FIG. 4H) again becomes HIGH at time t5 where the object lens is distant from the just focus point of the first layer by a distance which is half the distance at time t4, and the focus search drive voltage V− (FIG. 4F) is supplied to the focus drive coil 28. The supply of the focus search drive voltage V− continues until the object lens reaches the just focus point of the first layer (time t6). After time t6, digital data on the first layer is reproduced in the ordinary way.

Figure 5:
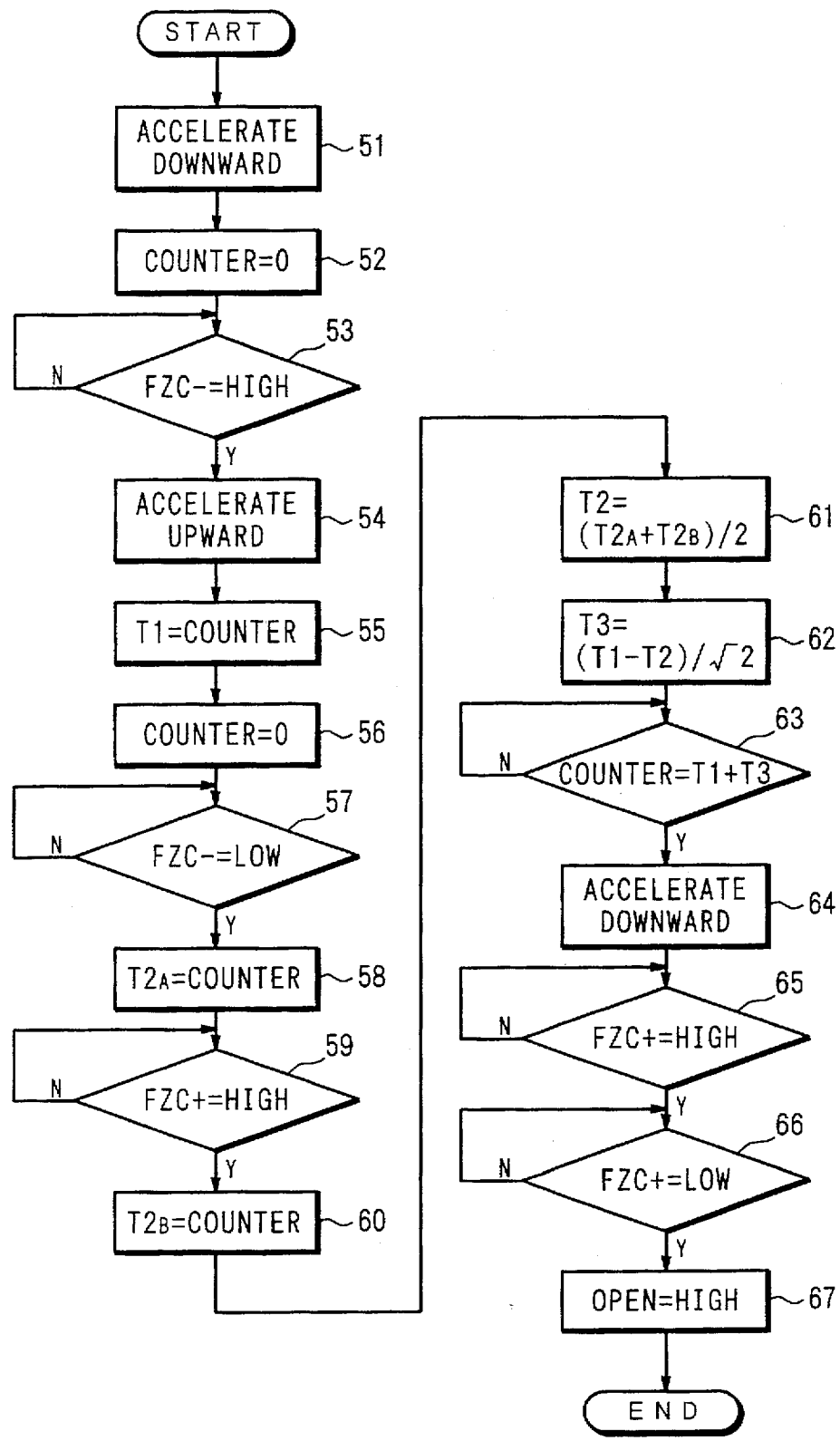
FIG. 5 is a flow chart of a soft-ware control of a focus jump operation from the second layer to the first layer in the multi-layered disk reproducing apparatus according to the invention.

FIG. 5 shows a process of control by soft ware for moving the object lens from the just focus point of the second layer to the just focus point of the first layer. In downward acceleration of the object lens in step 51, since the focus search drive voltage V− is supplied to the focus drive coil 28 by setting the drive signal DRV LOW and the focus OPEN signal LOW, the object lens is accelerated downward. In step 52, after the data of the counter is replaced with zero, the control proceeds to step 33. As to whether the zero-cross detection signal FZC− is HIGH or not in step 33, if FZC− is HIGH, the control proceeds to step 54; however, if FZC− is low, the control does not proceed to step 34 until FZC− becomes HIGH.

For upward acceleration of the object lens in step 54 after the zero-cross detection signal FZC− becomes HIGH, the drive signal DRV is set HIGH, and the focus search drive voltage V+ is supplied to the focus drive coil 28 to accelerate the object lens upward. Then the control proceeds to step 55. In step 55 the value of the counter is held in register T1, and in step 36 the value of the counter is again set zero. That is, register T1 holds the time in which the object lens is accelerated upward. As to whether the zero-cross detection signal FZC− is LOW or not in step 57, if FZC−is LOW, then the control proceeds to step 58; however, if FZC− is HIGH, the control does not proceed to step 58 until FZC− becomes LOW. In step 58 the value of the counter is held in register $T2_A$.

As to whether the zero-cross detection signal FZC+ is HIGH or not in step 59, if FZC+ is HIGH, the control proceeds to step 60; however, if FZC+ is LOW, the control does not proceed to step 60 until FZC+ becomes HIGH. In step 60 the value of the counter is held in register $T2_B$, and in step 41 the average value of register $T2_A$ and register $T2_B$ is held in register T2. In next step 62, a result of operation of $(T1-T2)/\sqrt{2}$ is held in register T3. In step 63, it is detected whether the sum of register T1 and register T3 equals the value of the counter or not. If they are equal, the control proceeds to step 64; however, if not, step 63 is repeated until the sum of T1 and T3 becomes equal to the value of the counter.

After that, as to downward acceleration of the object lens in step 64, the drive signal DRV is set LOW, and the focus search drive voltage V− is supplied to the focus drive coil 28 to accelerate the object lens downward. Detection of whether the zero-cross detection signal FZC− is HIGH or not in step 65 is a chattering step, and the control proceeds to step 66 when the zero-cross detection signal FZC+ is detected to be HIGH. As to whether the zero-cross detection signal FZC+ is LOW or not in step 66, if it is determined that FZC+ is LOW and that focalization on the just focus point of the first layer is established, the control proceeds to step 67. In step 67, the focus OPEN signal is set HIGH, thus changing the switch 18, terminating the focus jump from the second layer to the first layer, and restoring the focus servo loop.

FIGS. 6A to 6J show a timing chart for focus jump from the first layer to the third layer as an example of focus jump of two or more layers. At FIG. 6A, taking time T on the horizontal axis and the lens height x on the vertical axis, the moving track of the object lens is illustrated. As stated above, for changing focalization from the just focus point of the first layer to the just focus point of the third layer, the object lens is first moved to once overshoot the just focus point of the destined third layer beyond the just focus point of the second layer and further overshoot the just focus point of the fourth layer, and thereafter moved back to be focalized at the just focus point of the third layer. The speed of the object lens during these movements is shown at FIG. 6B where the lens speed v lies on the vertical axis.

As shown at FIG. 6A, the movement from the just focus point of the first layer to the just focus point of the third layer starts at time t1. That is, at time t1, the control is changed from the focus servo loop control to the focus jump control. In the period of time T1 from time t1 to time t2, the object lens is accelerated upward. Time t2 is the point where the S-curve of the focus error signal ERR of the first layer, when rising, surpasses the comparison voltage V2. After the object lens passes time t2, it is accelerated downward, passing a point (time t3) where the object lens intersects with the just focus point of the third layer. The object lens is further accelerated downward, and passes time t4 where the lens speed is zero, taking the same period of time as T1 in which the object lens was accelerated upward. The object lens, after passing time t4, is accelerated downward by time t5, and then controlled to stop at the just focus point of the third layer.

That is, as shown at FIG. 6C, digital data recorded on the first layer of the optical disk is read out as the reproduction RF signal by time t1. Since the digital data recorded on the optical disk relies on the presence or absence of pits, the reproduction RF signal exhibits the waveform as illustrated. In order to effect focus jump from the first layer to the third layer, the object lens must first be accelerated upward. Therefore, the focus OPEN signal (FIG. 6G) is set LOW, and the drive signal DRV (FIG. 6H) is set HIGH. The focus OPEN signal shown at FIG. 6G maintains the LOW level to the end of the control for focus jump.

When the drive signal DRV becomes HIGH, the object lens moves upward. Accordingly, the signal level of the reproduction RF signal is lowered. When the reproduction RF signal becomes lower than the comparison voltage V1, the focus OK signal FOK becomes LOW. When the signal level of the reproduction RF signal again goes high and surpasses the comparison voltage V1, the focus OK signal FOK becomes HIGH. This is because the focus jump causes the object lens to begin to move out of focalization on the first layer toward focalization on the second layer. In this example, since the focus jump is to be effected from the first layer to the third layer, as shown at FIG. 6C, focalization is moved from the first layer to the third layer, from the second layer to the third layer, from the third layer to the fourth layer, and finally to the destined third layer, passing the fourth layer another time. After that, the focus jump to the first layer is completed at time t6, and digital data recorded on the third layer of the optical disk is read out.

If a focus error signal ERR (FIG. 6E) is generated in the minus side and surpasses the comparison voltage V3, then the zero-cross detection signal FZC− shown at FIG. 6J becomes HIGH. When the focus error signal in the minus side approaches 0V and becomes smaller than the comparison voltage V3, the zero-cross detection signal FZC− becomes LOW.

When the focus jump from the first layer to the third layer is performed, the just focus point of the second layer becomes nearer than the just focus point of the first layer. Therefore, an S-curve is of a focus error signal ERR is generated in the minus side with reference to the just focus point of the first layer. After that, a plus-side S-curve based on the second layer is generated, and a minus-side S-curve is also generated. As illustrated, when the object lens passes the just focus point while moving upward, an S-curve of the focus error signal ERR first appears in the plus side and next in the minus side. When the object lens passes the just focus point while moving downward, an S-curve first appears in the minus side and next in the plus side.

In this manner, the process of focus jump of two or more layers is exactly the same as the process of focus jump of one layer except that the time T1 is extended to the rising of the S-curve of a focus error signal ERR of a destined layer. The maximum height for movement of the object lens is within the range where the object lens does not hit the optical disk.

Although the embodiment has been described setting the time from the start of acceleration of the object lens to the rising of the S-curve of the focus error signal ERR of a destined layer as the time T1 for the first acceleration of the object lens, the time T1 may be set otherwise provided the object lens can be accelerated such that focalization of the object lens moves beyond the just focus point of the destined layer.

Moreover, although the embodiment of the soft-ware processing according to the invention employs the address labelled T* as the register T*, it is also possible to use the label T* itself as the register T*.

According to the invention, focalization to a destined layer can be established in a short time as compared the method of resuming a focus search operation after canceling the focus servo control.

Also, the invention can reliably catch the just focus point of a destined layer even with a variety in distance between layers because focus servo control is performed after moving the focalization beyond the just focus point of the destined layer, unlike the method of upward or downward acceleration for a predetermined time.

Moreover, the invention can perform a reliable servo control after closing the focus servo loop because the speed of the object lens at the just focus point of a destined layer is approximately zero.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A disk reproducing apparatus, which reproduces data recorded on a plurality of layers of an optical disk, for performing a focus search which moves a position of an object lens from a focus position of a first layer of said optical disk to a focus position of a second layer, said apparatus comprising:

focus error generating means for generating a focus error signal indicating the degree said object lens is out of focus with said layers;

first comparison means for comparing said focus error signal to a first comparison voltage having a positive DC value, said first comparison means generating a positive zero-cross detection signal when said focus error signal exceeds said first comparison voltage;

second comparison means for comparing said focus error signal to a second comparison voltage having a negative DC value and generating a negative zero-cross detection signal when said focus error signal exceeds said second comparison voltage;

driving means, responsive to a driving voltage, for driving said position of said object lens; and drive voltage supplying means, responsive to said positive zero-cross detection signal and said negative zero-cross detection signal, for supplying said driving means with said driving voltage to drive said object lens from said focus position of said first layer to said focus position of said second layer.

2. The apparatus of claim 1, wherein said drive voltage supplying means comprise:

first object lens drive voltage generator means for generating said driving voltage causing said driving means to upward accelerate said object lens; and second object lens drive voltage generator means for generating said driving voltage causing said driving means to downward accelerate said object lens.

3. The apparatus of claim 2, wherein said first object lens drive voltage generator means and said second object lens drive voltage generator means generate voltages which are opposite in polarity.

4. The apparatus of claim 2, wherein said first object lens drive voltage generator means generates said driving voltage, thereby causing said driving means to upward accelerate said object lens for a period T1 from said focus position of said first layer toward said focus position of said second layer.

5. The apparatus of claim 4, wherein said first comparison means, upon determining that said focus error signal exceeds said first comparison voltage, generates said positive zero-cross detection signal, thereby causing said second object lens drive voltage generator means to generate said driving voltage, causing said driving means to downward accelerate said object lens for a period T2 to said focus position of said second layer and then past said focus position of said second layer to an overshoot position where said object lens slows to a stop and reverses direction toward said focus position of said second layer.

6. The apparatus of claim 5, wherein said drive voltage supplying means generates said driving voltage to said driving means to downward accelerate said object lens for a period T3 from said overshoot position to a midway point between said overshoot position and said focus position of said second layer.

7. The apparatus of claim 6, wherein said second object lens drive voltage generator means generates said driving voltage, thereby causing said driving means to upward accelerate said object lens for a period T4 from said midway point to said focus position of said second layer.

8. The apparatus of claim 7, wherein said first comparison voltage and said second comparison voltage are set to a value at which said focus error signal is approximately 0V.

9. The apparatus of claim 1, further comprising:
   third comparison means for comparing a data-representing RF signal reproduced from said optical disk to a third comparison voltage representing a minimum voltage acceptable for detecting said data from said reproduced RF signal; and
   switch means, responsive to said third comparison means, for gating said positive zero-cross detection signal to said drive voltage supplying means and gating said negative zero-cross detection signal to said drive voltage supplying means.

10. A disk reproducing apparatus, which reproduces data recorded on a plurality of layers of an optical disk, for performing a focus search which moves a position of an object lens from a focus position of a first layer of said optical disk to a focus position of a second layer, said apparatus comprising:
    an error generator for generating a focus error signal indicating the degree said object lens is out of focus with said layers;
    a first comparator coupled to said error generator which compares said focus error signal to a first comparison voltage having a positive DC value, said first comparator generating a positive zero-cross detection signal when said focus error signal exceeds said first comparison voltage;
    a second comparator coupled to said error generator which compares said focus error signal to a second comparison voltage having a negative DC value and generating a negative zero-cross detection signal when said focus error signal exceeds said second comparison voltage;
    an object lens driver, responsive to a driving voltage, which drives said position of said object lens; and
    a driving voltage supply, responsive to said positive zero-cross detection signal and said negative zero-cross detection signal, which supplies said object lens driver with said driving voltage to drive said object lens from said focus position of said first layer to said focus position of said second layer.

11. The apparatus of claim 10, wherein said driving voltage supply comprise:
    a first object lens drive voltage generator which generates said driving voltage causing said object lens driver to upward accelerate said object lens; and
    a second object lens drive voltage generator which generates said driving voltage causing said object lens driver to downward accelerate said object lens.

12. The apparatus of claim 11, wherein said first object lens drive voltage generator and said second object lens drive voltage generator generate voltages which are opposite in polarity.

13. The apparatus of claim 11, wherein said first object lens drive voltage generator generates said driving voltage, thereby causing said object lens driver to upward accelerate said object lens for a period T1 from said focus position of said first layer toward said focus position of said second layer.

14. The apparatus of claim 13, wherein said first comparator, upon determining that said focus error signal exceeds said first comparison voltage, generates said positive zero-cross detection signal, thereby causing said second object lens drive voltage generator to generate said driving voltage, causing said object lens driver to downward accelerate said object lens for a period T2 to said focus position of said second layer and then past said focus position of said second layer to an overshoot position where said object lens slows to a stop and reverses direction toward said focus position of said second layer.

15. The apparatus of claim 14, wherein said drive voltage supply generates said driving voltage to said object lens driver to downward accelerate said object lens for a period T3 from said overshoot position to a midway point between said overshoot position and said focus position of said second layer.

16. The apparatus of claim 15, wherein said second object lens drive voltage generator generates said driving voltage, thereby causing said object lens driver to upward accelerate said object lens for a period T4 from said midway point to said focus position of said second layer.

17. The apparatus of claim 16, wherein said first comparison voltage and said second comparison voltage are set to a value at which said focus error signal is approximately 0V but above affecting noise.

18. The apparatus of claim 10, further comprising:
    a third comparator for comparing a data-representing RF signal reproduced from said optical disk to a third comparator voltage representing a minimum voltage acceptable for detecting said data from said reproduced RF signal; and
    a switch, responsive to said third comparator, for gating said positive zero-cross detection signal to said drive voltage supply and gating said negative zero-cross detection signal to said drive voltage supply.

\* \* \* \* \*